United States Patent
Ludlow et al.

(10) Patent No.: US 9,798,902 B2
(45) Date of Patent: Oct. 24, 2017

(54) SELF-POWERED ANTI-TAMPER SENSORS

(71) Applicant: Midé Technology Corporation, Medford, MA (US)

(72) Inventors: Christopher Ludlow, Melrose, MA (US); Stephen Hanly, Charlestown, MA (US); Michael Motola-Barnes, Somerville, MA (US); Jeffrey Court, Stow, MA (US); Mark Spadafora, Somerville, MA (US)

(73) Assignee: Mide Technology Corporation, Medford, MA (US)

( * ) Notice: Subject to any disclaimer, the term of this patent is extended or adjusted under 35 U.S.C. 154(b) by 568 days.

(21) Appl. No.: 14/063,299

(22) Filed: Oct. 25, 2013

(65) Prior Publication Data

US 2016/0164518 A1  Jun. 9, 2016

Related U.S. Application Data

(60) Provisional application No. 61/718,348, filed on Oct. 25, 2012.

(51) Int. Cl.
*H03K 17/94* (2006.01)
*G06F 21/86* (2013.01)

(52) U.S. Cl.
CPC .................................. *G06F 21/86* (2013.01)

(58) Field of Classification Search
None
See application file for complete search history.

(56) References Cited

U.S. PATENT DOCUMENTS

| | | |
|---|---|---|
| 5,530,302 A | 6/1996 | Hamre et al. |
| 5,656,882 A | 8/1997 | Lazarus et al. |
| 6,069,433 A | 5/2000 | Lazarus et al. |
| 6,404,107 B1 | 6/2002 | Lazarus et al. |
| 6,420,819 B1 | 7/2002 | Lazarus et al. |
| 6,442,143 B1 | 8/2002 | Corry |
| 6,674,222 B2 | 1/2004 | Masters et al. |
| 6,802,216 B2 | 10/2004 | van Schoor et al. |
| 7,000,053 B2 | 2/2006 | Ho et al. |
| 7,571,058 B2 | 8/2009 | Sealing et al. |
| 7,757,565 B2 | 7/2010 | Chakrabartty |
| 7,927,292 B2 | 4/2011 | Brown |
| 2002/0193144 A1 | 2/2002 | Belski et al. |

(Continued)

OTHER PUBLICATIONS

Written Opinion of the International Searching Authority, dated Aug. 3, 2013, for International Application No. PCT/US2012/00211 (eight (8) pgs. total).

*Primary Examiner* — Jared Fureman
*Assistant Examiner* — Aqeel Bukhari
(74) *Attorney, Agent, or Firm* — Iandiorio Teska & Coleman, LLP

(57) ABSTRACT

An anti-tampering system and method typically featuring a printed circuit board with anti-tamper protection circuitry powered by a power source. Switching circuitry is coupled between the power source and the anti-tamper protection circuitry. A transducer outputs a signal to the switching circuitry electrically connecting the power source to the anti-tamper protection circuitry in response to a tampering event. The switching circuitry otherwise disconnects the power source from the anti-tamper protection circuitry to save power.

21 Claims, 7 Drawing Sheets

(56) References Cited

U.S. PATENT DOCUMENTS

| | | | |
|---|---|---|---|
| 2008/0047355 A1* | 2/2008 | Chakrabartty | A61F 2/468 |
| | | | 73/808 |
| 2008/0073491 A1 | 3/2008 | Fleischman et al. | |
| 2008/0180245 A1 | 7/2008 | Hsu et al. | |
| 2010/0164711 A1 | 7/2010 | Arms et al. | |
| 2010/0308664 A1* | 12/2010 | Face | H02J 13/0075 |
| | | | 307/104 |
| 2011/0004444 A1 | 1/2011 | Farrow et al. | |
| 2011/0084503 A1 | 4/2011 | Li et al. | |
| 2011/0093729 A1 | 4/2011 | Mucignat et al. | |
| 2011/0241839 A1 | 10/2011 | Lal et al. | |
| 2011/0267190 A1* | 11/2011 | Payson | G06F 21/86 |
| | | | 340/539.31 |
| 2012/0068827 A1 | 3/2012 | Yi et al. | |
| 2013/0066594 A1 | 3/2013 | Ludlow et al. | |

\* cited by examiner

SELF-POWERED ANTI-TAMPER SENSORS

RELATED APPLICATIONS

This application claims benefit of and priority to U.S. Provisional Application Ser. No. 61/718,348 filed Oct. 25, 2012 under 35 U.S.C. §§119, 120, 363, 365, and 37 C.F.R. §1.55 and §1.78 and is incorporated herein by this reference.

GOVERNMENT RIGHTS

This invention was made with U.S. Government support under Contract No. W9113M10C0093 awarded by Missile Defense Agency. The Government has certain rights in the invention.

FIELD OF THE INVENTION

The invention relates to anti-tampering techniques.

BACKGROUND OF THE INVENTION

The protection of critical program information (CPI) from unwanted transfer is necessary to ensure a technical and tactical advantage over adversaries or competitors. Anti-Tamper (AT) technology consists of engineering activities that prevent or delay exploitation of critical technologies in U.S. weapons systems, military systems, commercial electronics or commercial systems. The purpose of AT is to add longevity to critical technology by deterring efforts to reverse-engineer, exploit, or develop countermeasures against a system or component. System longevity (twenty plus years) is one of the challenges facing integration of effective AT systems into long life systems.

Various powered sensor based response techniques have been developed for AT systems. See U.S. Published Patent Application No. 2008/0180245; 2008/0073491; and 2011/0267190 incorporated herein by this reference. These systems require a means to constantly power the AT sensors/system for long periods of time. Current energy storage technologies such as batteries and capacitors are insufficient for long life AT systems due to their limited capacity or large required volumes to meet the needed power budget. One way to limit battery usage would be to either use fewer sensors or sense at low frequencies, thus enabling a reasonably sized battery to power a system for a long time. However, this leads to less reliable AT systems which will be more susceptible to attack.

SUMMARY OF THE INVENTION

The inventive approach enables long life AT systems by means of harvesting the intrusion energy from tamper events and using that energy to both trigger a dormant AT system as well as sense the type, intensity and location of the initial intrusion event. By allowing the AT system to remain completely un-powered for the majority of its life, the system power source (a long life Lithium based battery or other long life battery technology) can be saved for when potential threats are sensed by devices such as piezo smart sensors or triggers, thermal switches, x-ray photodiodes or other transducer components.

Featured is an anti-tampering system comprising anti-tamper protection circuitry powered by a power source and switching circuitry between the power source and the anti-tamper protection circuitry. A transducer is configured to output a signal (e.g. a voltage) to the switching circuitry thus electrically connecting the power source to the anti-tamper protection circuitry in response to a tampering event. The switching circuitry otherwise disconnects the power source from the anti-tamper protection circuitry to save power.

In one example, the switching circuitry, power source, and anti-tamper protection circuitry are disposed on a printed circuit board. The transducer may include a piezoelectric layer in a cover layer over the printed circuit board. The printed circuit board may also include therein a piezoelectric layer. The system may further include spacer material between the printed circuit board and the cover layer. In one example, the transducer is on the printed circuit board (e.g., a device such as a photodiode). The transducer may include two layers of piezoelectric material connected out of phase.

The printed circuit board may also include one or more connectors including a transducer connected to the switch. In one example, piezoelectric material is disposed about a threaded fastener. In still another example, piezoelectric material is disposed in an injector. In still another example, the piezoelectric material is disposed in a socket type connector.

One anti-tampering system features a printed circuit board including switching circuitry between a power source and anti-tampering protection circuitry, a cover over the printed circuit board including an integral transducer layer connected to the switching circuitry and configured to output a signal to the switching circuitry in response to a tampering event thus providing power from the power source to the anti-tamper protection circuitry. The printed circuit board may include the anti-tamper protection circuitry and may include an integral transducer layer connected to the switching circuitry.

Also featured is an anti-tampering method comprising coupling switching circuitry between a power source and anti-tamper protection circuitry to electrically decouple the power source from the anti-tamper protection circuitry in the absence of a tampering event. A transducer is added to an asset connected to the switching circuitry. In response to a tampering event, the transducer outputs a signal to the switching circuitry causing the power source to provide power to the anti-tamper protection circuitry. The asset is thus protected via the anti-tamper protection circuitry.

The asset may include a printed circuit board which may include the switching circuitry and the anti-tamper protection circuitry. A cover for the printed circuit board may include the transducer. Also, the asset may include one or more connectors including a transducer. The transducer may also be on the printed circuit board.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

Figure 1:
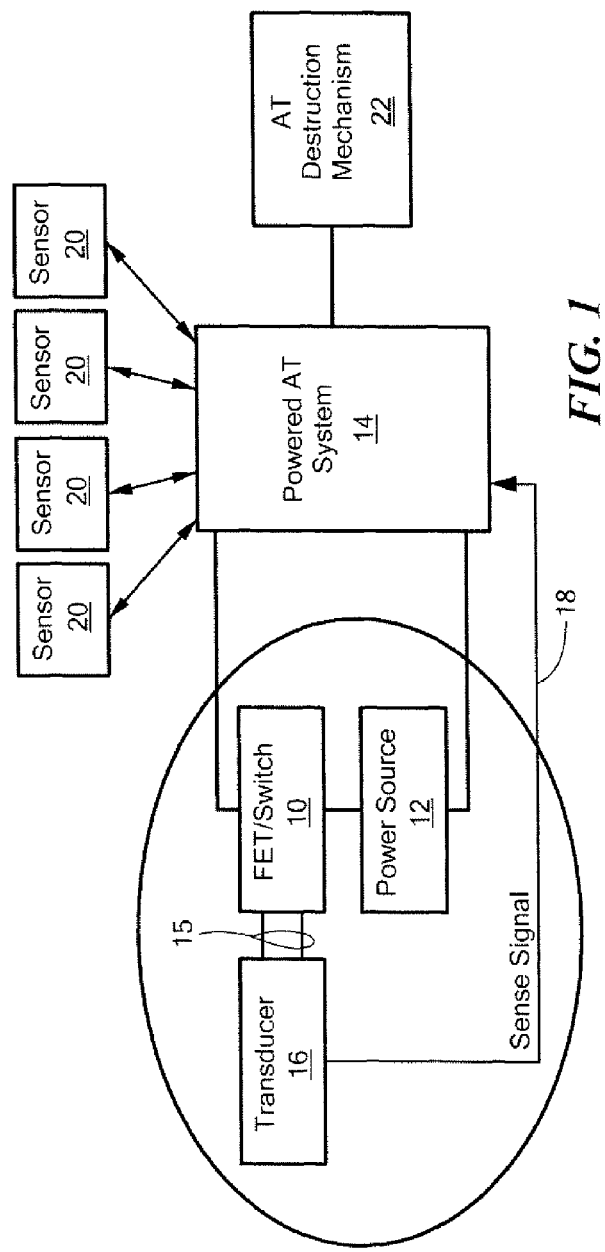
FIG. 1 is a block diagram showing the primary components associated with an example of a self powered anti-tampering system in accordance with the invention.

DETAILED DESCRIPTION OF THE INVENTION shows switching circuitry 10 between power source 12 and anti-tamper protection circuitry 14. Switching circuitry 10, which may be a low power FET device, normally decouples power source 12 (e.g., a battery) from anti-tamper protection circuitry 14 to save battery power. If, however, transducer 16 is activated by a tampering event, it outputs a signal, e.g., a voltage, to switching circuitry 10 (e.g., the gate of a FET) which then, in response closes the circuit and electrically couples power source 12 to anti-tamper protection circuitry 14 activating said circuitry which may then engage a powered sensing system, sound an alarm, erase data, disable the operation of certain circuitry, record an event, and/or similar actions known to those skilled in the art. There may optionally be other tampering sensors as shown at 20 and/or anti-tampering destruction mechanism 22 controlled by anti-tamper protection circuitry 14.

Transducer 16 requires no electrical power to activate and provides a signal to the switching circuitry. In one example, transducer 16 includes a layer of piezoelectric material which, when stressed, outputs a voltage to switching circuitry 10. A voltage signal may also be provided to anti-tamper protection circuitry 14 as shown at 18 which then functions accordingly to, for example, identify the location of the tamper event based on the location of the transducer.

Figure 2:
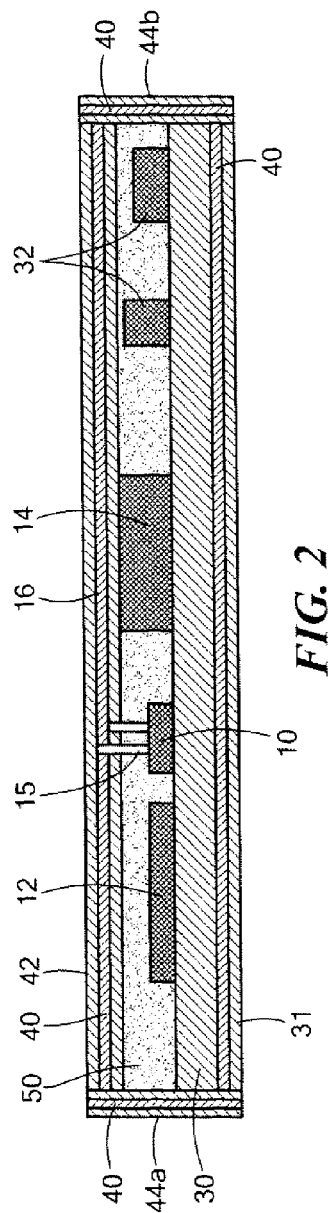
FIG. 2 is schematic cross sectional end view of a printed circuit board asset including the anti-tampering system components and circuitry of FIG. 1 in accordance with one example of the invention.

As shown in FIG. 2, an asset such as a PCI type card includes a printed circuit board 30 with devices, circuitry, and/or chips thereon as shown at 32 and which, in this particular example, also includes power source 12, switching device 10, and anti-tamper protection circuitry chip 14 connected together using conductive traces in printed circuit board 30.

The transducer in this particular example is a piezoelectric material layer 40 in cover 42, in sidewalls 44a and 44b, and/or even in printed circuit board 30 itself. When any of these structures are stressed during a tempering event, the piezoelectric layer outputs a voltage as discussed above delivered to switch 10 as shown at 15. The piezoelectric layer(s) can be electrically connected directly to switch 10 or indirectly to switch 10 via printed circuit board 30. Spacer layer 50 may also be provided to protect the components of the circuit board.

Figure 3:
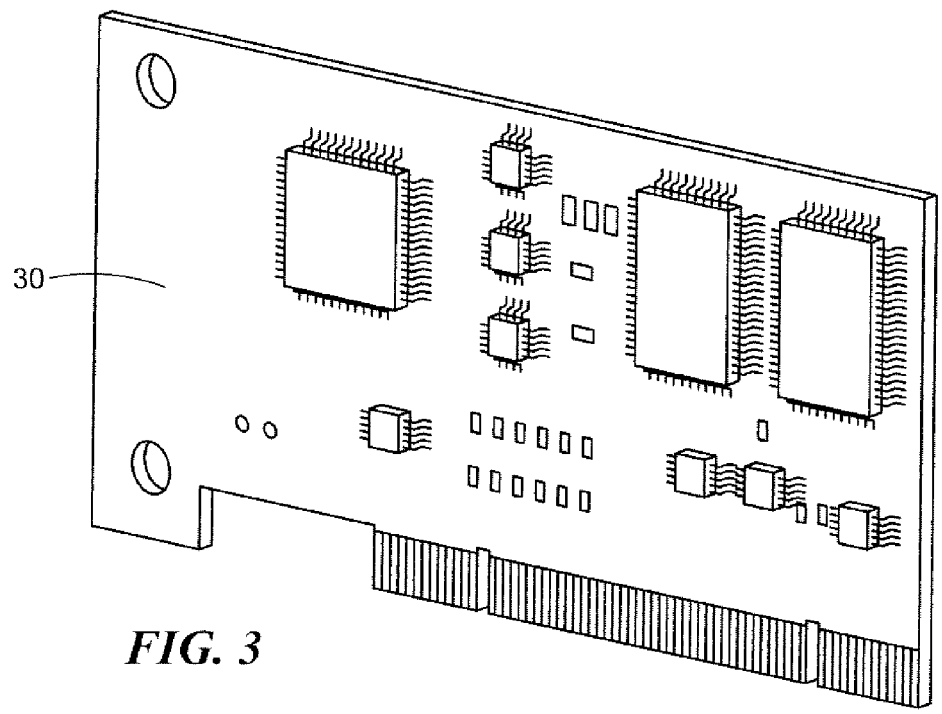
FIG. 3 is a schematic view showing a PCI circuit board card asset before the anti-tampering system technology is applied thereto.
Figure 4:
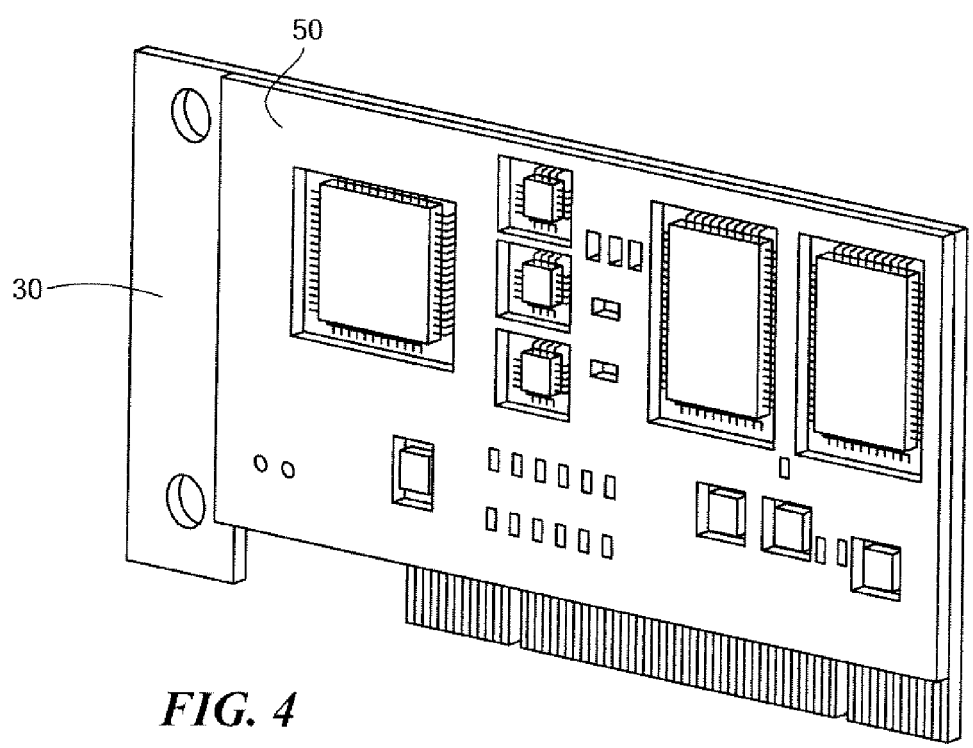
FIG. 4 is a schematic top view showing a spacer layer being added to the top of the PCI card of FIG. 3.
Figure 5:
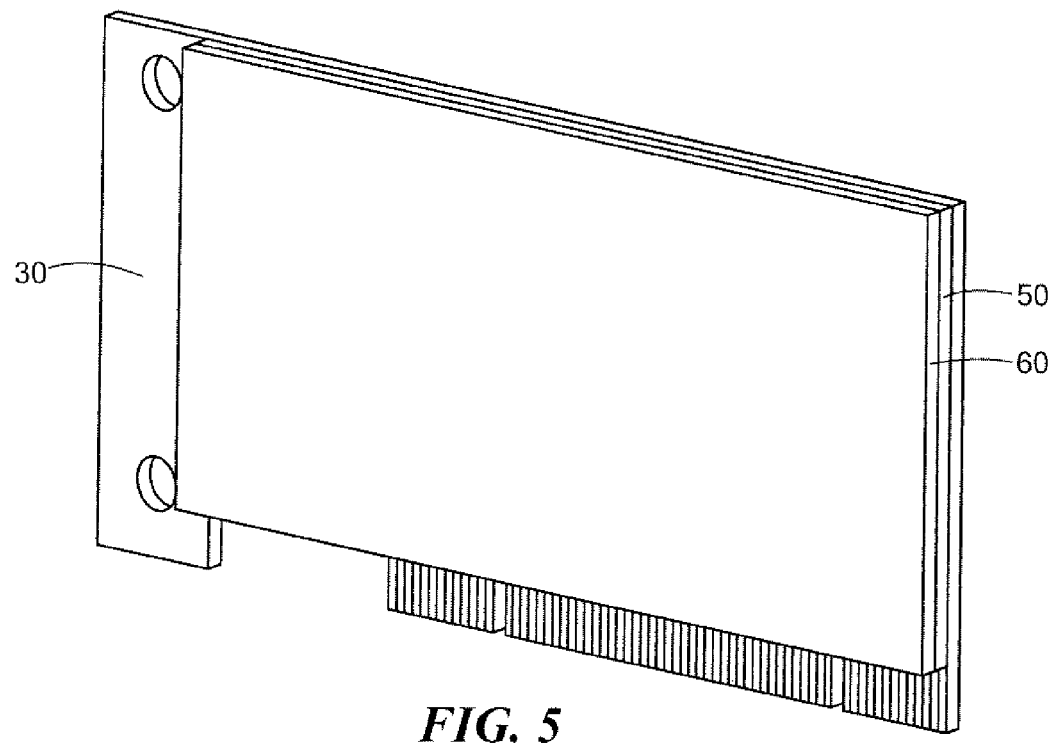
FIG. 5 is a schematic view showing a first copper clad circuit board layer being applied to the spacer material show in FIG. 4.
Figure 6:
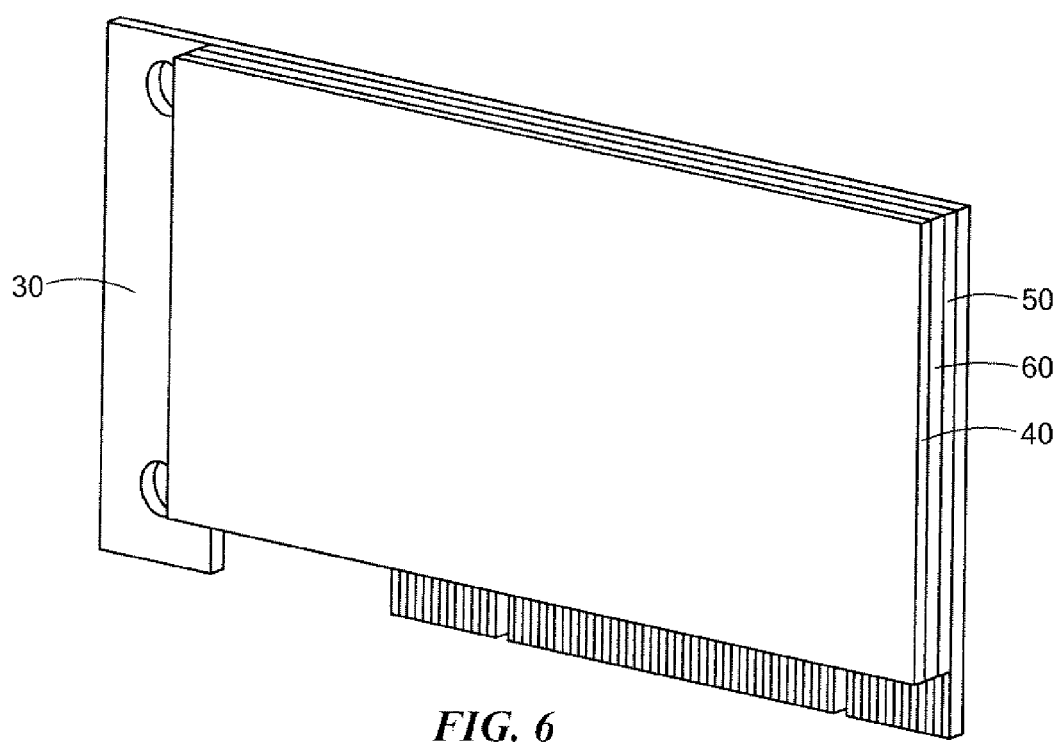
FIG. 6 is a schematic top view showing a piezoelectric layer being added to the first copper clad layer shown in FIG. 5.
Figure 7:
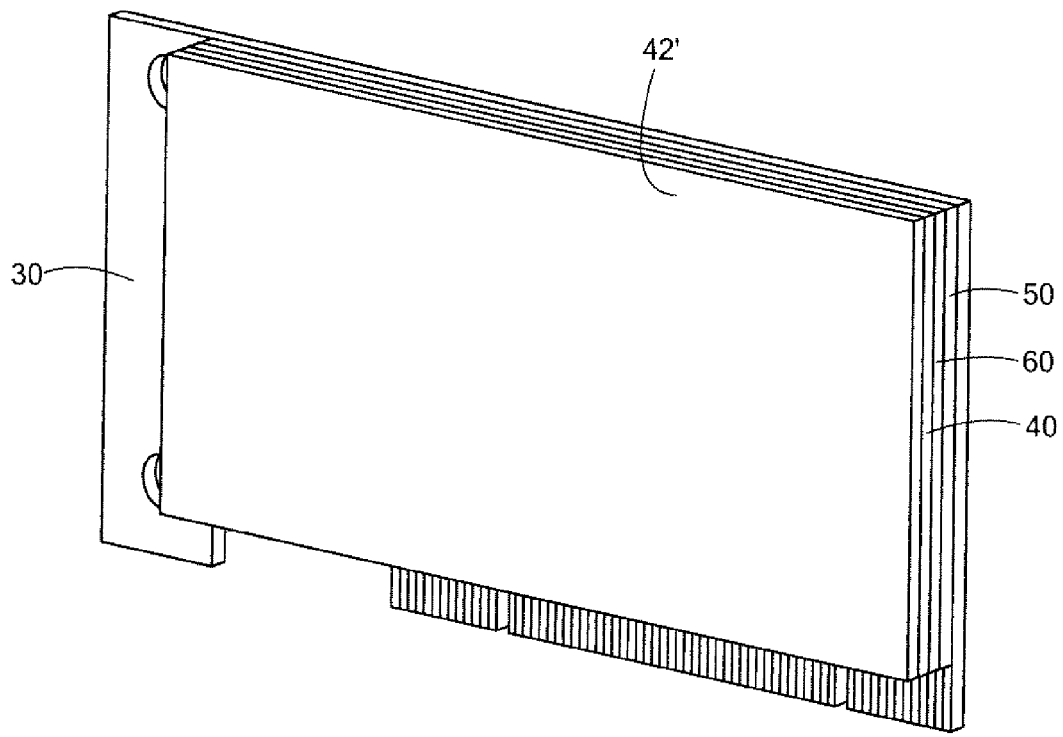
FIG. 7 is a schematic top view showing a final copper clad top layer being added over the piezoelectric layer shown in FIG. 6.

FIGS. 4-7 show an example where PCI card 30, FIG. 3 is fitted with spacer layer 50, FIG. 4 and then a first copper clad or kapton or FR4 layer 60, FIG. 5 of the cover. The piezoelectric layer 40 is then added, FIG. 6, and a final copper clad top layer is provided completing cover 42', FIG. 7. See U.S. Pat. Nos. 6,802,216; 6,674,222; 6,420,819; 6,404,107; 6,069,443; and 5,656,882 incorporated herein by this reference. Layer 40 is electrically connected to the switch previously mentioned which may reside on PCI card 30.

In some examples, transducer 16, FIG. 1 is board mounted component, external component, device or layer of or including thermoelectric material outputting a signal to the switch in response to heat. In another example, the transducer is a layer of or includes photodiodes outputting a signal to the switch in response to electromagnetic energy (light and/or x-rays). Thus, a tampering event may include stress, high temperatures, and/or radiation. In one example, device 16, FIG. 1 could include piezoelectric material, thermoelectric material, photodiodes, solar devices, RF harvesting devices, or the like.

The process of powering a long life AT system as described above is unique. Multiple means to harvest the energy from a tamper event are also unique. One unique design feature is enablement of persistent zero power sensing. The transducer utilizes piezoelectric materials, thermoelectric materials, photodiode materials, or other materials to convert the energy induced during a tamper event into a small amount of electrical energy to engage a dormant powered AT system. Furthermore, the piezoelectric sensors preferably use a packaging process to make them more robust and capable of withstanding harsher environments. See U.S. Pat. Nos. 6,802,216; 6,674,222; 6,420,819; 6,404,107; 6,069,433; and 5,656,882 incorporated herein by this reference. The designs may incorporate a constant mechanical loading on the transducer or be embedded in a rigid structure to ensure that an adversary could not "slowly" release them. This approach also makes the transducer less susceptible to providing energy during normal operating environments (shock, vibration, etc). Avoiding false positives is an important feature to any anti-tamper systems.

One application for the AT space is the ability to protect components such as FPGAs on a PCI type card. Specific components, local areas on the PCI card as well as the entire card or volume in which the card is located can be protected. Protecting the entire card offers significant benefits associated with the robustness of protection as well as the mitigation of false positives in addition to aligning with the piezoelectric packaging process.

Piezo materials can be packaged and laminated into copper etched FR4. FR4 is the same material that PCB such as PCI cards are manufactured from. Since piezo materials are compatible with FR4 material, they will be able to be customized and integrated into PCB designs. The overall thickness of lid 42', FIG. 7 can be approximately 0.020". However, it could be made even thinner if need be. The typical PCB is ~0.060" thick.

In one method, the PCB 30, FIG. 2 is designed such that connections 15 on the board are present to allow for connection from the piezo 40 to the ultra-low power FET 10. A spacer material 50 with a thickness of the highest component would be used to provide a completely flat surface for the piezo assembly to bond to. A layer of copper clad FR4 could surround the entire PCB as shown at 42, 44*a*, 44*b*, and 31. Piezo material 40 is then layered around the entire surface of the PCB even the edges to protect everything on the PCI card. Finally, another layer of copper clad FR4 would be used to make the other connection to the piezo and provide an exterior protective shell.

All of these layers are joined by a thin film adhesive. A heat and pressure process (not to exceed what the components can withstand) would be used to bond everything together. This concept would enable robust protection which was very sensitive to piercing and impact tamper events while being less sensitive to motion and vibration loads due to the stiffness of the structure. Connecting the piezo elements on the top and the bottom of the protected PCB out of phase will also reduce the sensitivity to motion and vibration loads. In one example, the positive terminal of the top piezo element is connected to the negative terminal of the bottom piezo element and the positive terminal of the bottom piezo element is connected to the negative terminal of the top piezo element. The entire PCI card would be protected, and any attempt to enter the protected card would result in straining of the piezo and triggering of FET 10. The FET would engage the long life battery and would power up an AT system which could ping additional sensors 20, FIG. 1 to determine if a tamper event was truly occurring.

The packaged FR4 piezos may have thicknesses ranging from 0.008" to 0.030". A typical PCI card (FR4 material) has a thickness of 0.060", the components make the PCI assembly thicker. This concept has the potential to add only 0.016" to the entire thickness of the PCI assembly making it a low mass and low profile option which provides very high quality AT protection.

In FIG. 4, a spacer material 50 is placed over the board 30. The spacer material would have areas removed from it to be able to fit over all the components on the board. The thickness of the spacer material would be equal to the highest component height off the board. As will all the layers which will be added, there is a very thin layer of adhesive between the spacer material and the PCB. The spacer may have additional material removed to assist in piezo strain during tamper events. Adhered to the spacer is a copper clad insulator to make a connection to the piezo. Conductor paths (two in the piezo, one in the copper clad layer) are for connecting the piezo to the board. After the bottom copper clad layer, the piezo layer (thickness dependent on desired sensitivity to tamper) and the top copper clad layer are added. This completes the assembly on one side of the PCI card.

There are also many ways to implement fastener protection for large volumes such as cabinets or on cards. Injectors, backplane connectors and standard fasteners are typical fasteners used in anti-tamper applications. All three types of fastener may incorporate a similar design approach where the piezoelectric material is mechanically loaded when assembled. In order to move the device, the operator would have to "flick" the piezo member. This in turn would send electric energy to the switch circuitry and alarm the anti-tamper system of a possible tamper event. This has two purposes. First, the piezo element is very stiff during normal operating conditions helping to avoid false positives. Second, this approach allows for even very delicate tamper events to "release" this stored mechanical energy and engage the AT system.

Figure 8:
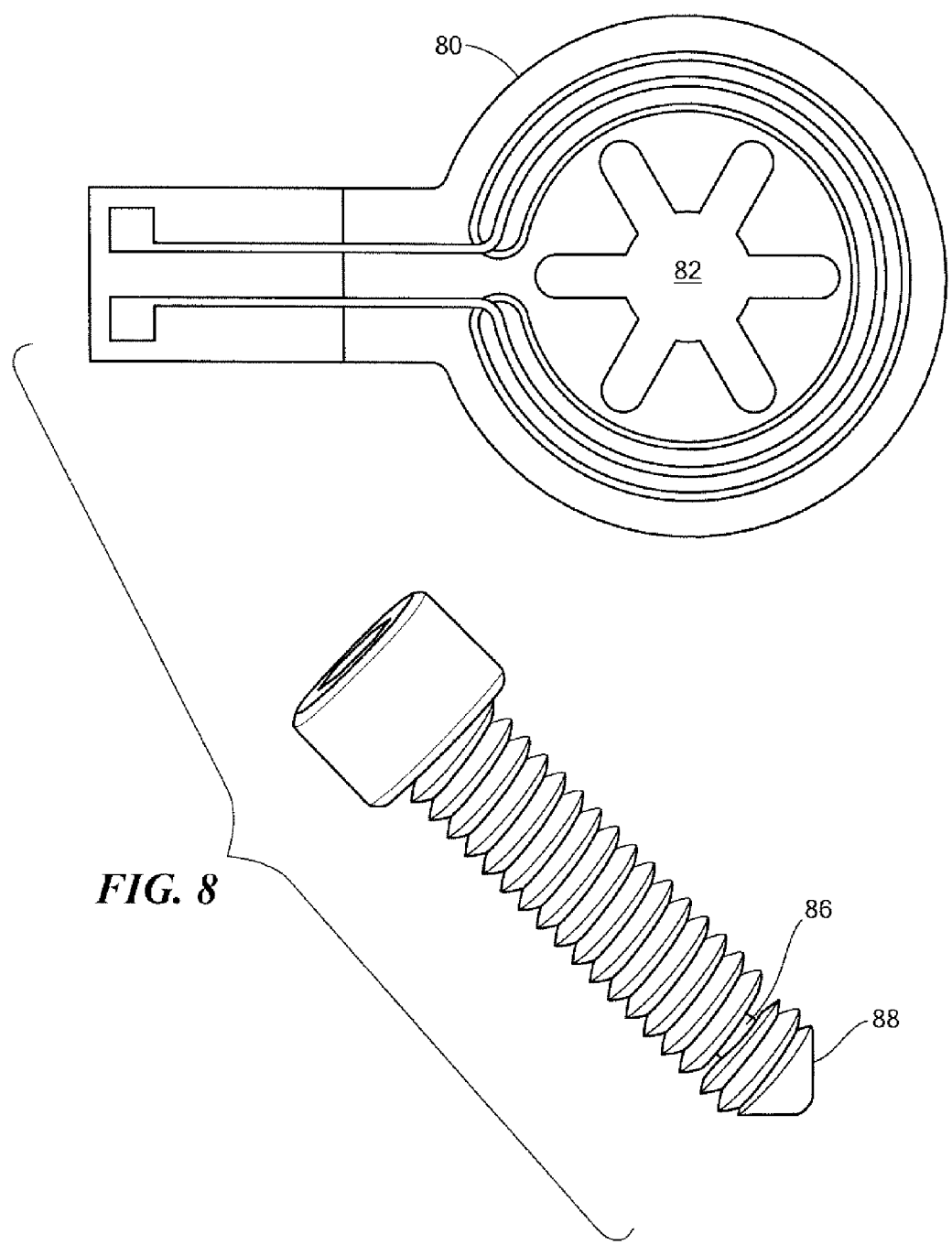
FIG. 8 is a schematic view showing a fastener and a piezoelectric fastener socket transducer member useful in connection with the anti-tampering system in some embodiments of the invention.
Figure 9:
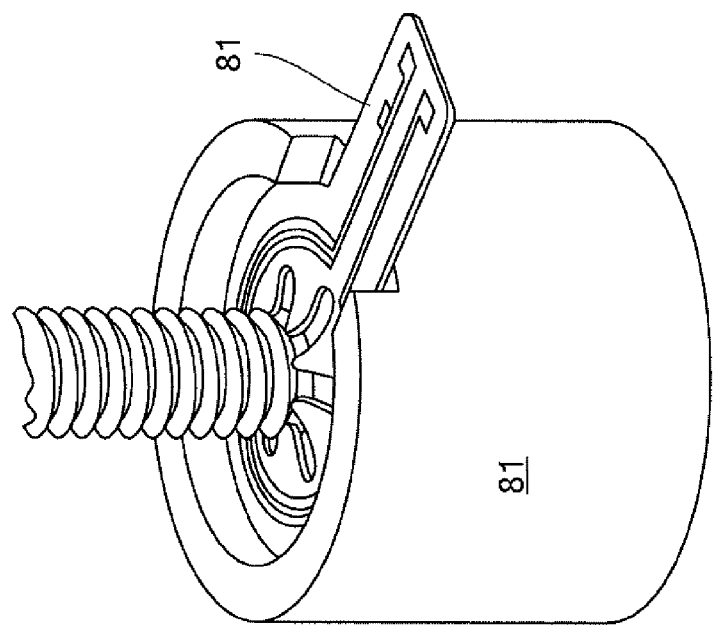
FIG. 9 is a schematic view showing a piezoelectric device of FIG. 7 added to a threaded socket connector.

One fastener concept can be seen in FIGS. 8-9. This design utilizes a circular piezo product 80 with a center hole 82 and a modified screw 84 as pictured. For this design, a standard screw needs to be machined to include a groove 86 and for its end 88 to be pointed. These modifications allow the screw to enter through the piezo product. If the screw, securing an asset to a back plane via connector socket 81, FIG. 9, for example, is turned during a tamper event, piezoelectric member 80 delivers a voltage to a switch which then powers the anti-tamper protection circuitry.

Figure 10:
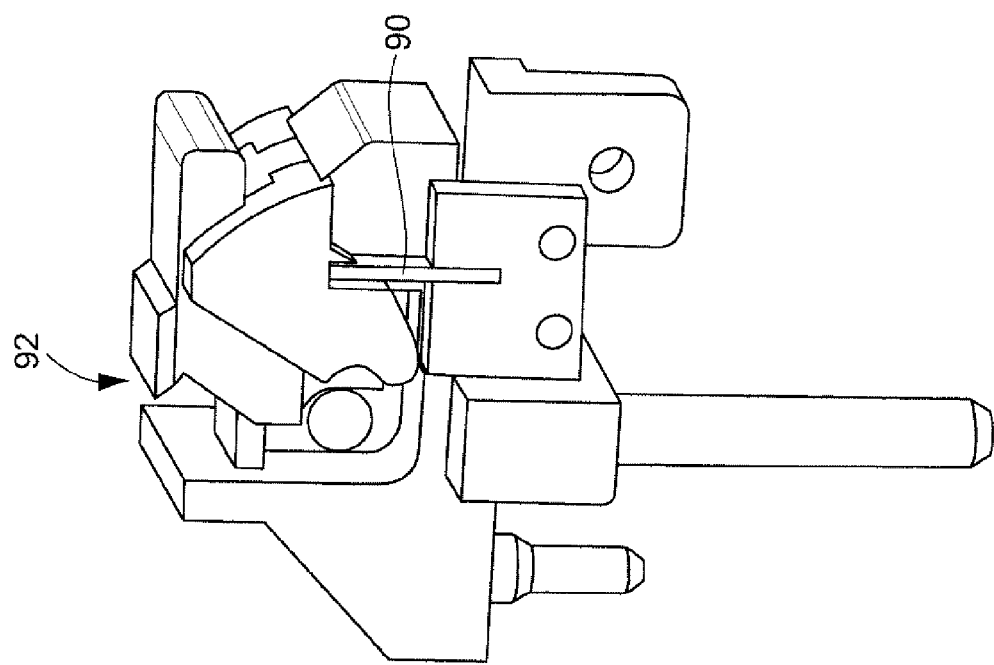
FIG. 10 is a schematic view showing an injector/ejector connector example with a piezoelectric transducer element incorporated therein.

FIG. 10 shows the injector/ejector concept. See U.S. Pat. Nos. 7,000,053 and 5,530,302 incorporated here by this reference. This concept was design to integrate directly with a commercially available injector or ejector 92. A small cantilevered piezo element 90 is either locked into a pre-loaded state or "flicked" as the injector 92 or ejector is accessed.

Figure 11:
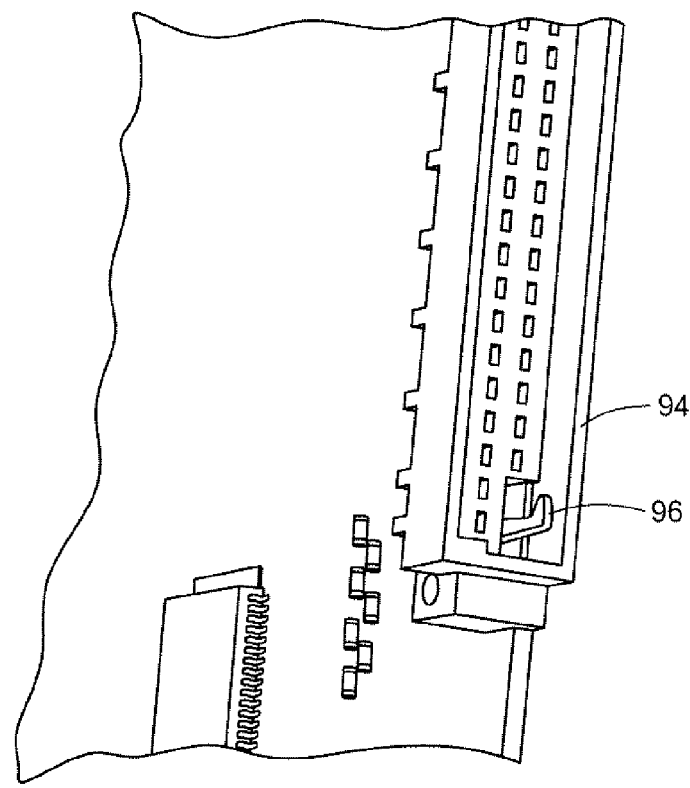
FIG. 11 is a back plane connector with a piezoelectric element incorporated therewith.
Figure 12:
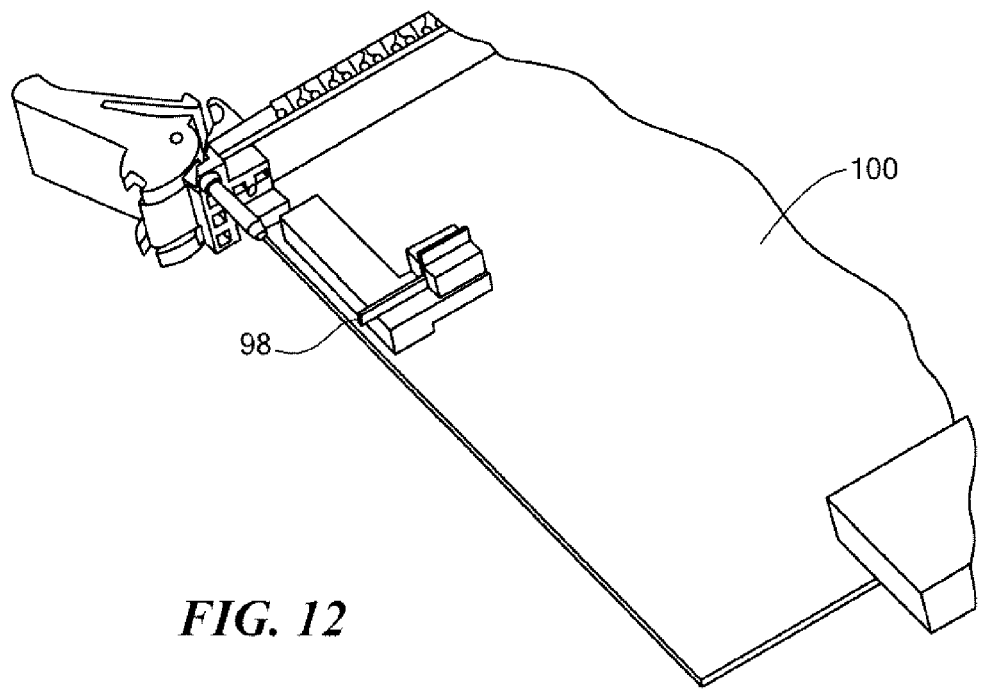
FIG. 12 is a schematic view showing another back plane connector with a piezoelectric transducer element incorporated therewith.

FIG. 11 shows a backplane connector 94 concept using the same approach as the injector/ejector concept. Piezo element 96 would latch onto a male PCB connector and element 96 would be stressed if the PCB is decoupled from back plane connector 94. In FIG. 12, cantilevered beam piezo 98 would attach near the back plane on a standard PCB 100. When the operator attempted to remove the PCB, the beam 98 could mechanically "flick" past some extrusion on the surrounding structure alerting the anti-tamper system of a possible tamper event.

In this way, connectors for a printed circuit board can include a transducer outputting a signal to the switching circuitry between the anti-tamper protection circuitry and its power source.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:
1. An anti-tampering system comprising:
 anti-tamper protection circuitry powered by a power source;
 switching circuitry between the power source and the anti-tamper protection circuitry; and
 a transducer outputting a signal to the switching circuitry electrically connecting the power source to the anti-tamper protection circuitry in response to a tampering event, whereas the switching circuitry otherwise disconnects the power source from the anti-tamper protection circuitry to save power.

2. The system of claim 1 in which the switching circuitry, power source, and anti-tamper protection circuitry are disposed on a printed circuit board.

3. The system of claim 2 in which the transducer includes a piezoelectric layer in a cover over the printed circuit board.

4. The system of claim 2 in which the printed circuit board further includes therein a piezoelectric layer.

5. The system of claim 2 further including spacer material between the printed circuit board and the cover.

6. The system of claim 2 in which the transducer is on the printed circuit board.

7. The system of claim 2 in which the printed circuit board includes one or more connectors.

8. The system of claim 7 in which said one or more connectors include a transducer connected to said switch.

9. The system of claim 8 in which piezoelectric material is disposed about a threaded fastener.

10. The system of claim 8 in which piezoelectric material is disposed in an injector.

11. The system of claim 9 in which the piezoelectric material is disposed in a socket type connector.

12. The system of claim 1 in which said transducer includes two layers of piezoelectric material connected out of phase.

13. An anti-tampering system comprising:
a printed circuit board including switching circuitry between a power source and anti-tampering protection circuitry, the switching circuitry normally decoupling the power source from the anti-tamper protection circuitry in the absence of a tampering event;
a cover over the printed circuit board including an integral transducer layer connected to the switching circuitry, the transducer layer configured to convert energy induced during a tampering event to an output signal to the switching circuitry in response to the tampering event thus electrically coupling the power source to the anti-tamper circuitry thereby providing power from the power source to the anti-tamper protection circuitry; and
a spacer layer between the cover and the printed circuit board.

14. The system of claim 13 in which the printed circuit board includes said anti-tamper protection circuitry.

15. The system of claim 13 in which the printed circuit board further includes an integral transducer layer connected to said switching circuitry.

16. An anti-tampering method comprising:
coupling switching circuitry between a power source and anti-tamper protection circuitry to electrically decouple the power source from the anti-tamper protection circuitry in the absence of a tampering event;
adding a transducer to an asset connected to the switching circuitry;
in response to a tampering event, the transducer outputting a signal to the switching circuitry causing the power source to provide power to the anti-tamper protection circuitry; and
protecting the asset via the anti-tamper protection circuitry.

17. The method of claim 16 in which the asset includes a printed circuit board.

18. The method of claim 17 in which the printed circuit board includes the switching circuitry and the anti-tamper protection circuitry.

19. The method of claim 17 further including a cover layer for the printed circuit board including the transducer.

20. The method of claim 16 in which the asset includes one or more connectors including a said transducer.

21. The method of claim 17 in which the transducer is on the printed circuit board.

* * * * *